Patented Dec. 14, 1937

2,101,853

UNITED STATES PATENT OFFICE

2,101,853

COMPOSITION OF MATTER AND METHOD AND STEPS OF MAKING AND USING THE SAME

Mortimer T. Harvey, East Orange, N. J., assignor to The Harvel Corporation, a corporation of New Jersey No Drawing. Application April 24, 1934, Serial No. 722,145

6 Claims. (Cl. 260—3)

The present invention relates to compositions of matter and to methods and steps of making and using the same, said compositions being of the nature of phenolic condensations with aldehydes; and the present invention relates more particularly to methods and products used for and obtained by reacting an aldehyde with an ether of a phenolic compound and a hydrocarbon in which the characteristic oxygen of the phenol is connected to the hydrocarbon at an inner carbon atom of the hydrocarbon radicle. The present invention may also be stated as comprising the obtaining of a condensation of an aldehyde with a compound such as is obtainable by reacting a phenolic material with an unsaturated hydrocarbon in contact with concentrated sulphuric acid after which the compound is separated from the sulphuric acid and any other materials that may be present.

An object of the present invention is to provide an oil soluble resinous material by the condensation reaction of an aldehyde with an ether formed from a phenolic compound and an unsaturated hydrocarbon.

Other objects and advantages of the present invention will be apparent from the following disclosure of products of the invention and of methods and steps of making and using the same.

I have discovered that ethers of a phenolic compound and a hydrocarbon in which the characteristic oxygen atom of the phenol is connected to an inner carbon of the hydrocarbon react with formaldehyde and other aldehydes in the presence of an alkaline catalyst, for example ammonia, to form resins which are soluble in oils, for example, in linseed oil, in China-wood oil, in varnoline, in kerosene, in turpentine, or in combinations of these and other oils or solvents. This reaction also takes place in the presence of weak and strong acids with the production of resins characteristic of the reactions of the above said materials under the influence of such acids. By the term "inner carbon" as used herein is meant a carbon having either two or three other carbons directly connected to it.

Examples of unsaturated hydrocarbons suitable for use in the practice of the present invention are propylene, butylene, amylene, hexylene and the other homologous hydrocarbons, including all the normal and isometric forms thereof. These may be taken separately or in any mixtures thereof, for example, the unsaturated compounds found in illuminating gas are suitable. Also the unsaturated hydrocarbons formed or resulting from the production of gasoline or any process for the cracking of mineral oils can be used. Many such unsaturated compounds are formed in great quantities in the processes used for cracking mineral oils to produce gasoline, kerosene and analogous hydrocarbons used for power or fuel. Some of these by-products are aliphatic and others are aromatic hydrocarbons, but most of them have ethylenic linkages.

Gas house oil drip and coke house distillate, particularly the materials thereof which distill in the range extending from about 120° C. to about 225° C., contain hydrocarbons, having ethylenic linkages, which are suitable for the practice of the present invention.

Further examples of materials having unsaturated groups in the form of ethylenic linkage in hydrocarbons and suitable in the practice of the present invention are styrene, indene, (both found in gas house drip), unsaturated hydroaromatic hydrocarbons such as the terpenes (for example pinene), dihydronaphthalene, dihydrobenzene, and tetrahydrobenzene.

Examples of phenolic compounds suitable for making ethers for the purposes of the present invention are phenol, the cresols, cresylic acid, the xylenols, the naphthols and the phenolic compounds generally.

Examples of aldehydes and aldehyde producing materials suitable for use in the practice of the present invention are formaldehyde, acetaldehyde, furfuraldehyde, benzaldehyde, paraformaldehyde, hexamethylenetetramine and equivalents of these materials.

Examples of the methods and steps and products of the present invention are as follows.

A.—A mixture of about forty parts by weight of cresylic acid and twenty-five parts of amylene was cooled to about 25° C. and about forty parts by weight of concentrated sulphuric acid added slowly, the mixture being well stirred and the temperature being maintained below 30° C. During the addition of the sulphuric acid, reaction took place between the cresylic acid and the amylene to form a mixture of aromatic amylene ethers corresponding to the phenolic compounds present in the cresylic acid used, the amylene radicle being connected to the oxygen of the phenols at an inner carbon thereof.

The sulphuric acid was removed by gravimetric separation and the ether washed with water. The latter was insoluble in ten per cent caustic soda solution.

Substantially equal parts by weight of the ether obtained as described above and forty per cent formaldehyde are mixed together with ten per cent of their total weight of twenty-eight per cent ammonia and heated under a reflux condenser to obtain a condensation of the ether and the formaldehyde. The final product of the condensation is resinous and frangible when cold, is clear and light colored, with the color stable to light and heat, and is soluble in linseed oil and China-wood oil and in mixtures thereof. A suitable proportion is equal parts by weight of each of the resin, of linseed oil and of China-wood oil.

B.—Substantially equal parts by weight of cresylic acid and a 150° to 200° C. fraction of gas house oil drip are stirred together while about the same weight of sulphuric acid is added slowly and the temperature maintained at below 30° C. After this addition, the mixture is left stand for about two hours at normal temperature. When the reaction between the cresylic acid and the oil drip is complete, the resulting ether is separated from the sulphuric acid, washed several times with one or two volumes of water, the ether and water mixture being left to stand in a container with a bottom drain for a number of hours (for example, twelve hours) after which the ether is drawn off the bottom. It is noted that at the first mixing with water, the ether floated on the water and at the second the ether sinks to the bottom. The ether is insoluble in alkali, for example ten per cent caustic soda solution, and is neutralized with ammonia, five per cent of the volume of the ether being used.

Substantially equal weights of this ether and of forty per cent formaldehyde solution are mixed with about six per cent of their total in twenty-eight per cent ammonia and refluxed for from one to two hours to form the resin, which sinks in the water of the formaldehyde. The resin is separated and washed free of salts. This resin is very light colored and has a good melting point and is soluble in linseed oil, in China-wood oil, and in mixtures thereof. A suitable proportion is equal parts by weight each of the resin, of linseed oil and of China-wood oil.

The hydrocarbons used in this example are obtained in somewhat similar constitution from coke house distillates and are known as solvent naphtha.

C.—Substantially equal parts by weight of cresylic acid and of styrene are stirred together and the temperature maintained at below 30° C. while an equal weight of concentrated sulphuric acid is added slowly. The resulting ether is separated and washed.

About equal weights of the ether and cresylic acid and ten per cent of the total of twenty-eight per cent ammonia when refluxed give a resin soluble in linseed oil, in China-wood oil and in mixtures thereof.

The above examples are given as illustrations of the practice of the present invention and are not to be taken as limiting the invention. The ethers formed can be washed with caustic solution, when desired, to remove any phenolic products present after which excess caustic can be washed out with water. Also the ethers can be refined by distillation. Further, the proportions of the hydrocarbons used to the cresylic acid or other phenolic material used can be varied to obtain optimum ratios depending on their particular compositions; fundamentally a molecule of unsaturated hydrocarbon is used for each molecule of phenolic material.

In a method of making the products of the present invention on a large scale, the reaction of the unsaturated hydrocarbon and the phenolic compound with the aid of sulphuric acid to form an ether is carried on in a material from which the unsaturated hydrocarbon is obtained and the resulting ether separated from other constituents of said material. For example, mixtures of benzole, toluene, xylene and the like together with unsaturated hydrocarbons having various boiling points, as an example in a boiling range from about 140° C. to about 225° C., are found in gas house oil drip and in coke house distillates the proportion of toluene, benzol, etc., fraction to the unsaturated hydrocarbon fraction being substantially two to one. The benzole, toluene, xylene fraction command prices much higher and have a much wider use than do the fraction containing the unsaturated hydrocarbons and the two fractions are often separated by thickening the unsaturated hydrocarbons with sulphuric acid to form cumaron resins, after which the benzole, toluene, xylene fraction is distilled off. According to the present invention, phenolic compounds are mixed with the gas house oil drip or coke house distillate in molecular amounts equivalent to the molecular quantity of unsaturated hydrocarbons present, or in a predetermined quantity sufficient to form the ether or ethers. The concentrated sulphuric acid is added slowly, with stirring, in molecular quantity substantially equal to that of the phenolic compound or of the said unsaturated hydrocarbon. The temperature is maintained below 20° C. (and this cooling step is cheaper in this method because the quantity of toluene, benzole, etc., is proportionately so large that these absorb a good proportion of the heat of reaction). After the sulphuric acid has been added, the mixture is washed several times with water and left stand for about two hours to separate the last washing water when the ether is distilled off, the toluene, xylene, benzole fraction coming off first. The sulphuric acid can be reclaimed from any residue present and used again.

In a manner similar to the above, unsaturated compounds resulting from the cracking of petroleum products can be reacted in the original mixture to form ethers, and these latter can be separated by distillation. Such unsaturated hydrocarbons are formed in the manufacture of gasoline by certain methods. Although a certain amount of unsaturated hydrocarbons are considered by some to be desirable in power gasoline, an excessive amount is avoided because of the tendency of the unsaturated compounds to form gummy material in internal combustion engines. The method of the present invention affords an economic method of forming a valuable material and separating the same from the gasoline.

Although in the above examples the reaction temperatures for making the ether are given as below 30° C. and below 20° C., it is to be understood that the various reactions can be carried on at various temperatures below those at which sulphonation takes place.

In making oil soluble resins from ethers and aldehydes according to the present invention, the indications are that the reaction should take place slowly. However with ammonia and with caustic as a catalyst, that is, on the alkaline side, the reaction always produces an oil soluble resin, but with acid catalyst the reaction goes over very quickly and produces a resin which is not soluble in oil, that is, insoluble in linseed oil, for example.

In making oil soluble resins of the present invention the yield of resin in weight is seventy-five per cent or more of the total weight of the phenolic compound and unsaturated compound used.

Having thus described my invention, what I claim is:

1. The method of making a resinous material which comprises reacting a hydrocarbon having ethylenic linkage with a phenol in contact with sulphuric acid to produce a phenolic ether in which the oxygen is connected to the said hydrocarbon at the position of said ethylenic linkage and condensing the produced phenolic ether with an aldehyde with the aid of ammonia and heat.

2. The method of obtaining an oil soluble resinous material which comprises acting with ammonia as a catalyst with the aid of heat on a mixture of an aldehyde and a product obtained by contacting sulphuric acid with a mixture of a phenol and an unsaturated hydrocarbon at a temperature below 30° C.

3. The method of obtaining an oil soluble resinous material which comprises the steps of mixing together a phenol and an unsaturated hydrocarbon in contact with concentrated sulphuric acid at a temperature below 30° C., separating the resulting product, and acting with ammonia as a catalyst on a mixture of said resulting product with an aldehyde with the aid of heat.

4. The method of obtaining an oil soluble resinous material which comprises the steps of mixing together a phenol and an unsaturated hydrocarbon in contact with concentrated sulphuric acid at a temperature below 30° C., separating the resulting ether, and acting with ammonia as a catalyst on a mixture of said resulting ether with an aldehyde with the aid of heat.

5. The method of making a resinous product which comprises reacting, with ammonia as a catalyst, an aldehyde with an ether having the following representative formula:

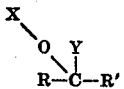

where X and the oxygen atom, O, together represent a phenolic radicle and R and R' represent hydrocarbon radicles and Y represents hydrogen or a hydrocarbon radicle.

6. The method of making an oil soluble resinous product which comprises reacting, under the influence of ammonia as a catalyst, an aldehyde with an ether having the following representative formula:

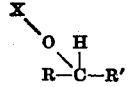

where X and the oxygen atom, O, together represent a phenolic radicle and R and R' represent hydrocarbon radicles.

MORTIMER T. HARVEY.